April 24, 1928.  1,667,033

A. C. HARRELL

AUTOMATIC TRAIN PIPE COUPLING

Filed July 6, 1926  2 Sheets-Sheet 1

Inventor

A. C. Harrell by Wilkinson & Giusta

Attorneys.

April 24, 1928.
A. C. HARRELL
1,667,033
AUTOMATIC TRAIN PIPE COUPLING
Filed July 6, 1926
2 Sheets-Sheet 2
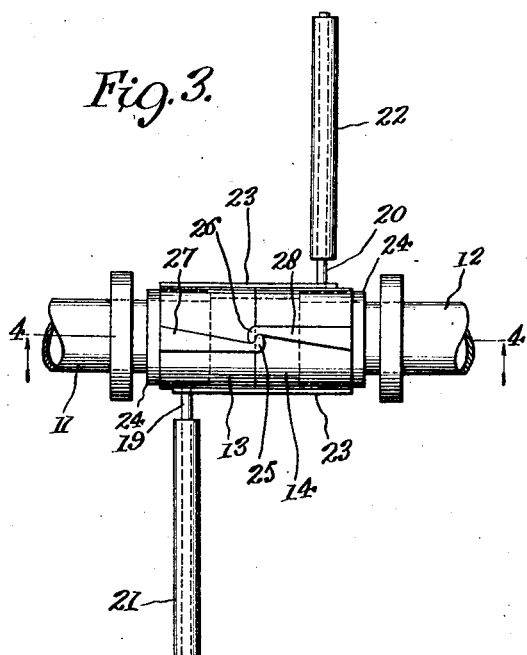
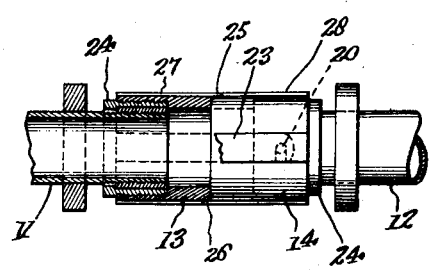
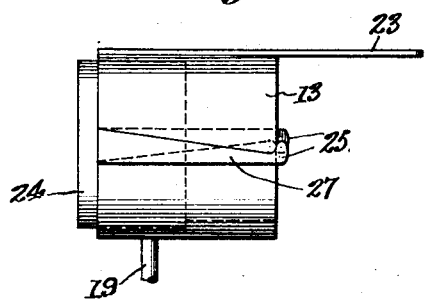
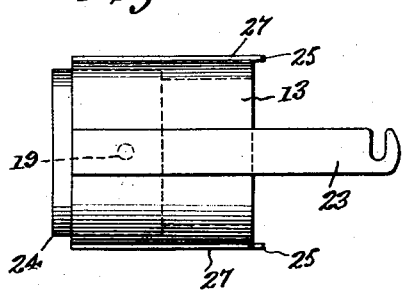
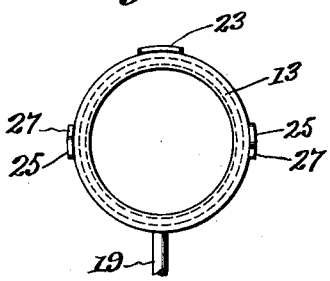
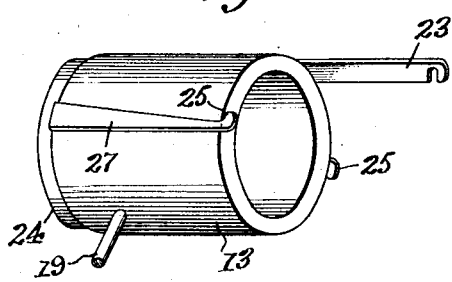
Inventor
A. C. Harrell
by Wilkinson & Giusta
Attorneys.

Patented Apr. 24, 1928.

1,667,033

UNITED STATES PATENT OFFICE.

ARTHUR C. HARRELL, OF PENSACOLA, FLORIDA.

AUTOMATIC TRAIN-PIPE COUPLING.

Application filed July 6, 1926. Serial No. 120,815.

The present invention relates to improvements in automatic train pipe coupling, and consists in certain improvements in the device illustrated and described in U. S. Patents Nos. 1,359,395, granted November 6, 1920 and 1,407,665, granted February 21, 1922.

An object of the invention is to provide means for securing the coupling heads of the train pipe more securely together to prevent leakage and accidental uncoupling.

Another object of the invention is to provide certain spring suspension operating as guys and guides for the piston spring cylinders.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is a top plan view on an enlarged scale of the coupling head arrangement.

Figure 4 is a longitudinal section taken on the line 4—4 in Figure 3.

Figure 5 is an enlarged plan view with parts broken away showing one of the heads.

Figure 6 is a similar view with the head turned at substantially right angles from the position, shown in Figure 5.

Figure 7 is an end view of the same, and

Figure 8 is a perspective view showing one of the coupling heads.

Referring more particularly to the drawings, 9 and 10 designate the piston spring cylinders which are more particularly described in the patents, aforesaid, and through which the train pipes 11 and 12 extend having the coupling heads 13 and 14 on the abutting ends thereof. At 15 is shown the sleeve carried by each cylinder or car with the cuff 16 at the outer end thereof, and the cuff and sleeve having the cam slot 17 for the purpose of rotating the coupling heads in opposite directions, whereby to interlock the same.

Figure 1:
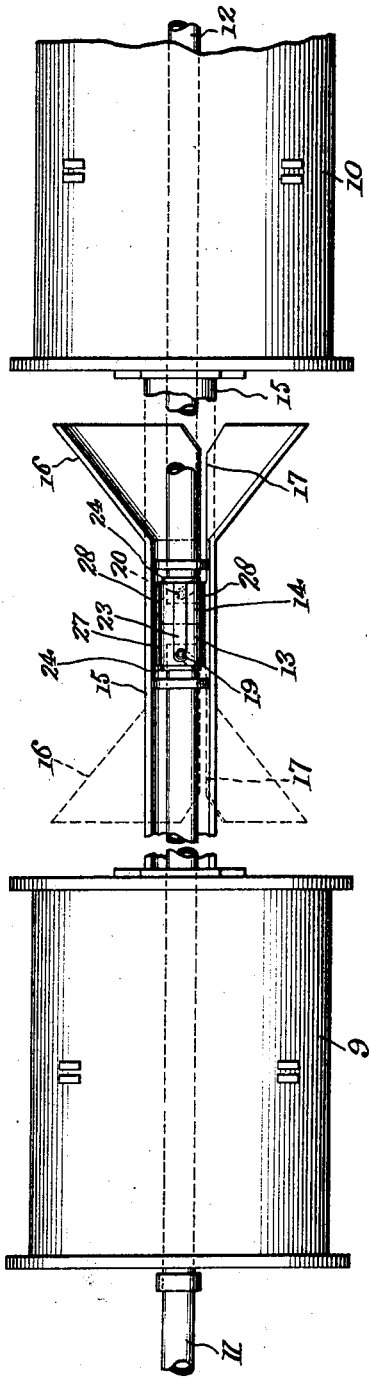
Figure 1 is a top plan view, with parts broken away, of a device constructed according to the present invention.
Figure 2:
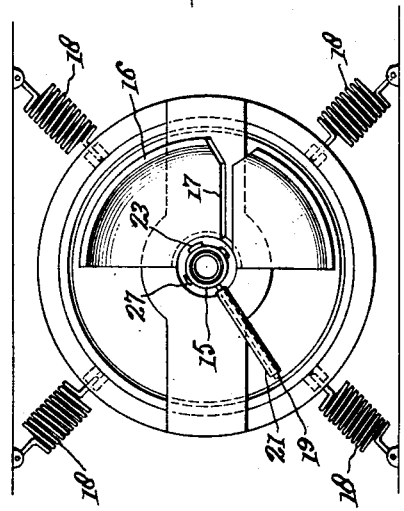
Figure 2 shows an end view of one of the cylinders and adjacent parts.

As shown in Figure 2, the piston spring cylinders are supported by a number of preferably four, strong spiral springs 18, such springs being connected to the outer portion of each cylinder and to appropriate supports on the car frame or floor of the car. These springs act as guys and guides to the cylinder.

Referring more particularly to Figures 3 to 8, the heads 13 and 14 are rotatably mounted upon the ends of the train pipes. This construction is more particularly referred to in the prior patents above mentioned, and it forms no particular part of the present invention. The coupling heads are also provided with the pins 19 and 20. These pins preferably have the rollers 21 and 22, which engage the cam slots 17 in the cuffs and sleeves for the purpose of imparting rotation to the heads 13 and 14 in opposite direction as the heads are brought together. Each coupling head is provided with a claw 23 for engaging the pin on the opposite coupling head and thus interlocking the heads. These claws are in the form of long thin, flat metal pieces riveted or otherwise secured to the coupling heads, and each claw extending for quite a distance beyond the coupling head by which it is carried toward the other coupling head, so as to overlap the companion coupling head and to be in a position to engage the pin on the other coupling head. It is advantageous to have the pin 20 located radially of the support for the rotary head and within the perimeter or between the ends of the support 24 for the rotary head in order to avoid binding of the rotary parts upon the fixed parts when the pin and its roller engage in the cam slot and effect turning movement of the rotary portion of the coupling head. For the purpose of avoiding leakage between the coupling heads, however, the elongated claws engaging at the points where the pins must be located are rather ineffectual and but two of these claws have been proposed in the prior patents, such claws being located at 180° apart. The result is that leakage is apt to occur at points substantially 90° from the claws, and it is to avoid this expensive and annoying condition that the present invention has been developed.

The invention consists in supplementing the action of the claws and in making the action more positive toward the prevention of leakage and also to avoid accidental uncoupling of the parts. In accordance with the invention the coupling heads are provided with knuckles 25 and 26 which are intended to interlock upon a line intersecting the line of the meeting faces of the coupling heads, such knuckles being located at 90° on the circle of the coupling heads from the claws 23. Moreover the knuckles are provided with inclined engaging surfaces, which cam the coupling heads together and effectually avoid leakage. These knuckles may be formed directly upon the coupling heads themselves, or upon bars 27 and 28 which may be riveted, brazed or otherwise secured to the coupling heads.

Each pair of knuckles is intended to be arranged with the noses thereof projecting in opposite directions, or opposed to one another and with the rounded sockets in the adjacent end portions of the holding bars, also mutually opposed, so that upon rotation of the coupling heads the opposed knuckles will move into interlocking engagement and cam the coupling heads together and into proper position with respect to the claws and pins. The knuckles are thus engaged by virtue merely of bringing the coupling heads together and rotating the same, this rotary action being secured by the engagement of the pins or the rollers thereon with the offset slots 17 in the cuffs and sleeves. The device will effectually prevent leakage and owing to the depression into which the noses of the knuckles snap, the rotary heads will be held against accidental uncoupling and this condition will prevail until the heads are actively rotated by withdrawing the same away from each other.

It is obvious that various changes and modifications may be made in the details of construction and design of the above specifically described embodiment of this invention without departing from the spirit thereof, such changes and modifications being restricted only by the scope of the following claims.

What is claimed is:—

1. In combination with opposed train line sections having rotary heads, a radial pin on each head, a claw carried by each coupling head and extending beyond the coupling head for engaging the pin on the opposite head, and knuckles on the coupling heads at substantially 90° from said claw, said knuckles having opposed noses with depressions at the bases of the noses for receiving the opposed noses whereby coupling heads may be drawn together and locked against accidental rotation.

2. In combination with an automatic train pipe coupling having meeting rotary heads, a pin projecting from each head, a claw on each head for engaging the pin on the opposite head, knuckles carried by each head intermediate the pin and claw and projecting toward the opposite head, said knuckles being angularly displaced from the pin of each head, said knuckles having opposed interlocking noses with inclined engaging faces adapted for interfitting engagement when the heads are brought together and turned to simultaneously interlock the knuckles when said claws are interlocked with the pins whereby to draw the heads together adjacent their meeting faces and at points out of line with the engagement of the claws with the pins.

ARTHUR C. HARRELL.